(No Model.)
E. KITE.
DIFFERENTIAL GEAR FOR TRACTION ENGINES.
No. 376,528. Patented Jan. 17, 1888.
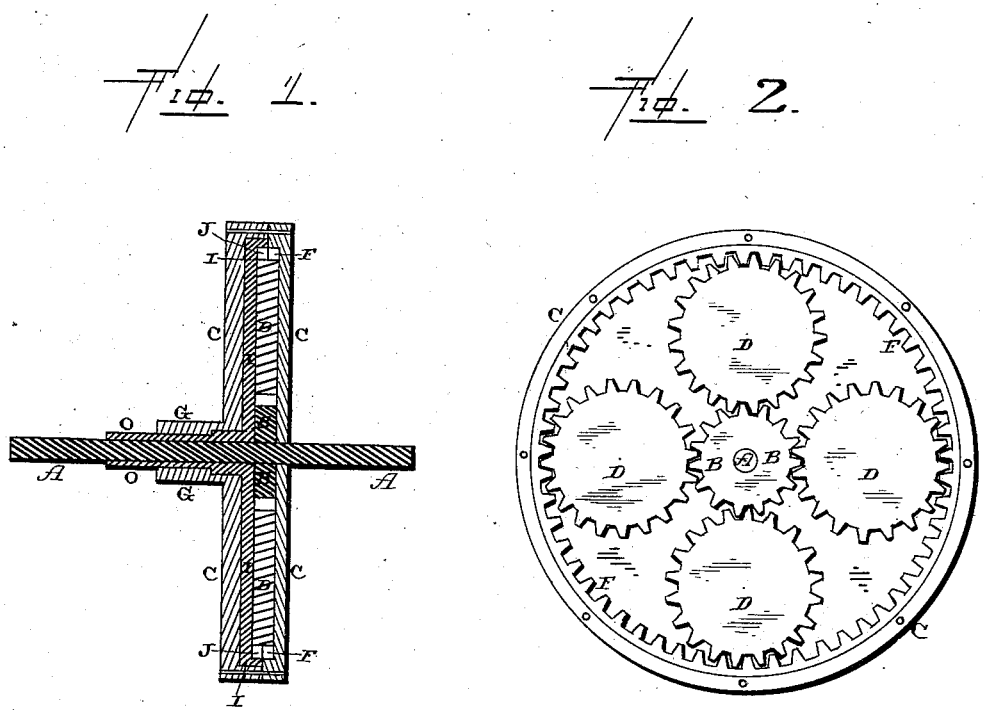
Witnesses.
L. F. Gardner
Edm. P. Ellis
Inventor.
Edw. Kite,
per F. A. Lehmann,
Atty

UNITED STATES PATENT OFFICE.

EDWARD KITE, OF PITTSBURG, INDIANA.

DIFFERENTIAL GEAR FOR TRACTION-ENGINES.

SPECIFICATION forming part of Letters Patent No. 376,528, dated January 17, 1888.

Application filed October 11, 1887. Serial No. 252,028. (No model.)

*To all whom it may concern:*

Be it known that I, EDWARD KITE, of Pittsburg, in the county of Carroll and State of Indiana, have invented certain new and useful Improvements in Differential Safety-Gears for Traction-Engines; and I do hereby declare the following to be a full, clear, and exact description of the invention, such as will enable others skilled in the art to which it pertains to make and use it, reference being had to the accompanying drawings, which form part of this specification.

My invention relates to an improvement in differential safety-gears for traction-engines; and it consists in the combination of a solid shaft to which a pinion is secured, a suitable number of pinions which gear with the central pinion upon the solid shaft, and two internal gears of the same diameter, but having a different number of teeth, and which mesh with the circumferential pinions, each of the internal gears being provided with a hollow shaft, which incloses the solid one, and from which power may be applied, as will be more fully described hereinafter.

The object of my invention is to provide a safety power-gear for traction-engines and hoisting-machines, and which will hold the machinery without the use of brakes of any kind.

Figure 1 is a vertical section of a gearing embodying my invention. Fig. 2 is a section taken at right angles to Fig. 1.

A represents the solid shaft, to which the driving-power is applied, and to which is secured a pinion, B. Placed inside the internal gear C, and arranged circumferentially around the pinion B, are a suitable number of larger pinions, D, which mesh with the pinion B and receive and transmit the power from the shaft A. The internal gear C is made in the form of an inclosing case or frame, and which is provided with the internal teeth, F, which mesh with the pinions D. Extending from one side of this internal gear C is a hollow shaft, G, from which the power derived from the shaft A may be applied in any suitable manner. Placed inside of this hollow gear G is a second internal gear, I, which also has teeth J, to mesh with the pinions D in the same manner as the teeth F of the internal gear C. The number of teeth upon the gears I G differ, in order that one may have a larger number than the other, and thus receive a slightly-different rate of speed. Extending from this internal gear I, which is inclosed by the one C, is a hollow shaft, O, which incloses the solid shaft A. The two hollow shafts G O are placed concentric to the solid shaft A, as shown, and from either one or both of the hollow shafts, or from the internal gear C, power may be taken as may be desired.

By means of the construction here shown and described a differential safety-gear is produced for traction-engines and hoisting machinery, and which will not allow any of the machinery to move unless the solid driving-shaft is set in motion. No matter what weight may be applied to the hoisting machinery, or at what angle the traction-engine may be moving up or down hill, no brakes of any kind are necessary, because the gears cannot be made to communicate motion to the solid shaft A. By changing the diameters of the pinions D and the number of their cogs and the number of cogs in the internal gears the ratio of power can be varied at will.

The devices above described enable a traction-engine to be turned around like any ordinary wagon, where it would otherwise be impossible.

Having thus described my invention, I claim—

The combination of the solid shaft provided with a pinion, B, the circumferential pinions D, and the internal gears C I, which mesh with the pinions D, and which have the hollow shafts G O extending from them, substantially as shown and described.

In testimony whereof I affix my signature in presence of two witnesses.

EDWARD KITE.

Witnesses:
H. F. FAIRCHILD,
L. D. BOYD.